(12) United States Patent
Metzger

(10) Patent No.: US 7,918,465 B2
(45) Date of Patent: Apr. 5, 2011

(54) ADJUSTABLE HEIGHT TRAILER

(76) Inventor: Donald C. Metzger, Quakertown, PA (US)

( * ) Notice: Subject to any disclaimer, the term of this patent is extended or adjusted under 35 U.S.C. 154(b) by 288 days.

(21) Appl. No.: 12/232,374

(22) Filed: Sep. 16, 2008

(65) Prior Publication Data

US 2010/0066041 A1 Mar. 18, 2010

(51) Int. Cl.
*B60G 17/00* (2006.01)
(52) U.S. Cl. ............ 280/6.153; 280/6.151; 280/6.155; 280/438.1; 280/439; 280/490.1; 296/24.31; 296/24.4
(58) Field of Classification Search ............ 280/6.156, 280/433, 438.1, 439, 490.1, 6.153, 6.151, 280/6.155, 6.157, 6.15; 296/24.31, 24.4; 410/129, 130, 129.13
See application file for complete search history.

(56) References Cited

U.S. PATENT DOCUMENTS

| | | | | |
|---|---|---|---|---|
| 308,808 | A | * | 12/1884 | Smith et al. ............ 119/409 |
| 2,636,746 | A | * | 4/1953 | Meldrum ............ 280/43.22 |
| 3,574,388 | A | * | 4/1971 | Stone ............ 296/168 |
| 4,468,061 | A | * | 8/1984 | Blake ............ 296/24.31 |
| 4,530,538 | A | | 7/1985 | Greene, Jr. et al. |
| 4,886,290 | A | | 12/1989 | Pourchon et al. |
| 5,090,720 | A | * | 2/1992 | Heider et al. ............ 280/438.1 |
| 5,513,595 | A | * | 5/1996 | Chatterton ............ 119/412 |
| 5,667,231 | A | | 9/1997 | Dierks et al. |
| 5,700,026 | A | | 12/1997 | Zalewski et al. |
| 5,863,049 | A | | 1/1999 | Mahvi |
| 6,098,995 | A | | 8/2000 | Danis |
| 6,394,734 | B1 | | 5/2002 | Landoll et al. |
| 6,688,835 | B1 | | 2/2004 | Buher |
| 6,895,897 | B1 | | 5/2005 | Culp et al. |
| 6,923,452 | B1 | | 8/2005 | Zachmeier et al. |
| 7,731,255 | B2 | * | 6/2010 | McJunkin ............ 296/24.4 |
| 2003/0067136 | A1 | | 4/2003 | Scott et al. |
| 2007/0096406 | A1 | | 5/2007 | Brandt et al. |

FOREIGN PATENT DOCUMENTS

JP 2002-137678 5/2002

\* cited by examiner

*Primary Examiner* — Eric Culbreth
(74) *Attorney, Agent, or Firm* — Richard C. Litman

(57) ABSTRACT

The adjustable height trailer is a fifth wheel-type trailer with a single rear axle supporting the rear of the trailer and a fifth wheel hitch supporting the front. The rear axle and hitch have adjustable height suspensions, allowing the trailer to be lowered or raised uniformly while remaining hitched to the towing vehicle. One embodiment is configured as a livestock trailer with a series of stall positions therein. The loading and exit doors are generally diagonally opposite one another. A series of adjustably positionable partitions is installed on overhead tracks, with a partition placed between each animal as they are boarded and positioned in the trailer. Animals depart the trailer through the opposite door, with the partitions being repositioned correspondingly. The trailer suspension allows the trailer to be lowered to the underlying surface to facilitate loading and unloading animals therefrom, or other commodities, depending upon the trailer configuration.

13 Claims, 15 Drawing Sheets

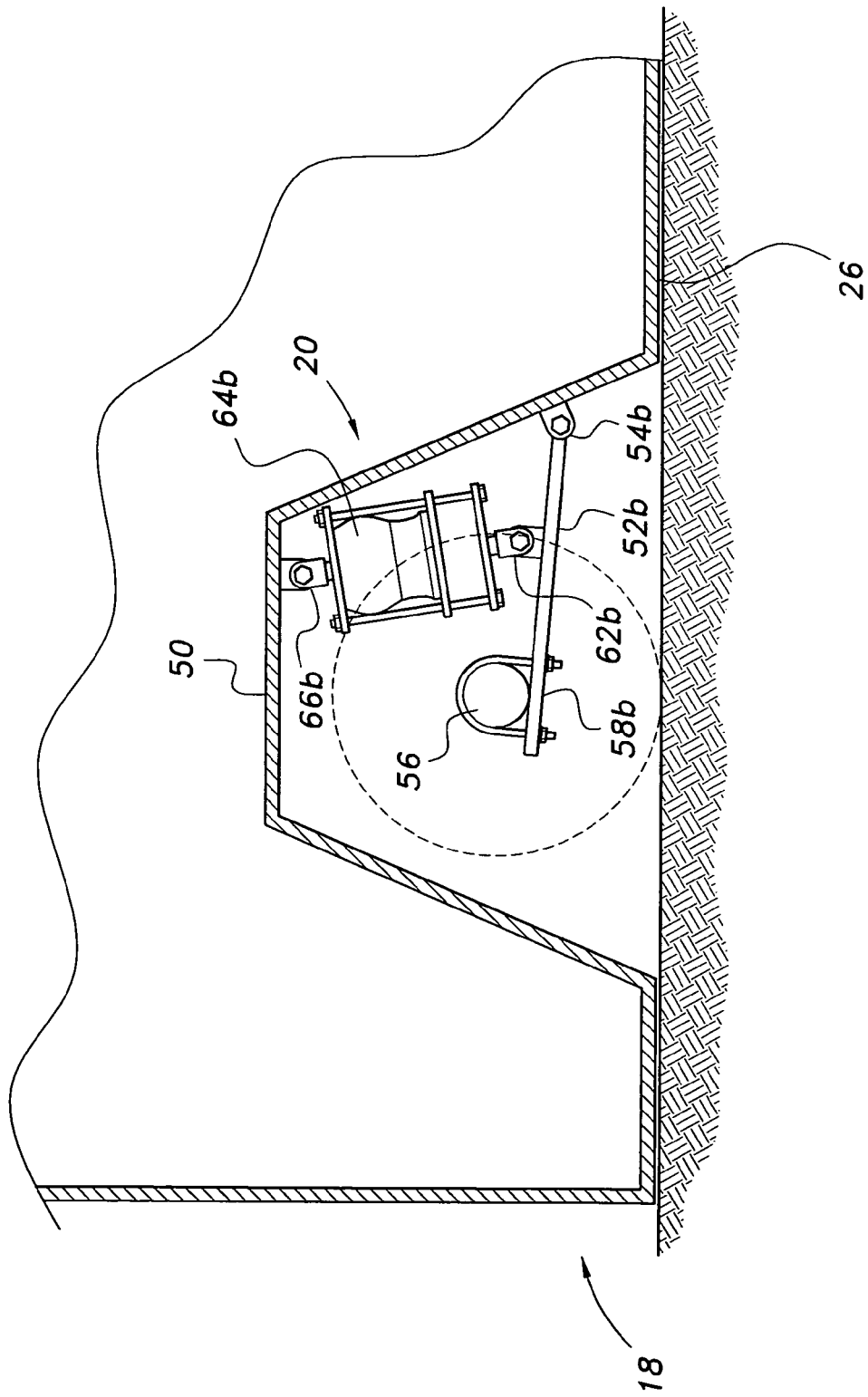

ADJUSTABLE HEIGHT TRAILER

BACKGROUND OF THE INVENTION

1. Field of the Invention

The present invention relates generally to vehicle trailers. More specifically, the present invention is an adjustable height trailer having a fifth wheel, an adjustable height forward hitch, and an adjustable height rear axle.

2. Description of the Related Art

The floors of vehicle trailers are conventionally relatively high above the underlying surface, to provide sufficient ground clearance when underway. When such trailers are parked for loading and unloading, the relatively high trailer floor complicates such loading and unloading. Typically, powered machinery (e.g., a fork lift, etc.) is necessary to facilitate the job, with larger trailers and cargos.

So-called "fifth wheel" trailers, i.e., trailers having one or more rear axles with the forward support being by means of a hitch mounted on a plate or "wheel" on the back of the towing vehicle, are commonly used for transport of larger and/or heavier cargo. Most people are familiar with the conventional semi-trailer pulled by a truck tractor, with this assembly using the fifth wheel trailer principle. Smaller fifth wheel trailers are also in relatively common use for towing by smaller vehicles, e.g., pickup trucks and smaller flatbed trucks equipped with a fifth wheel hitch.

Articulating or adjustable height rear suspension systems have been developed for such trailers, but such systems only serve to lower the rear of the trailer. The forward end of the trailer remains elevated on the fifth wheel hitch of the towing vehicle, unless the trailer is unhitched from the towing vehicle to allow the forward end of the trailer to be lowered. This is a cumbersome procedure that requires an additional step in order to lower both ends of the trailer to ground level.

A relatively high trailer floor is even more inconvenient and cumbersome in a livestock trailer. Large animals, and particularly horses, are uncomfortable when presented with relatively narrow sloping ramps and similar boarding and unloading fixtures. The uncertain footing sensed by the animal, along with possible vehicular traffic and commotion in the area in many circumstances, may "spook" the animal to the extent that the animal injures itself on or in the trailer, or in nearby traffic.

Another common problem with livestock trailers is the provision of a single rearwardly disposed door for loading and unloading. Animals are generally loaded head first through the door, but then must back out of the trailer when unloading. This, in combination with a sloping ramp in a conventional trailer, gives an animal even more cause to be nervous during the unloading operation. This is even true in larger trailers, with their multiple stalls for holding a number of horses or other large animals.

Attempts have been made in the past to facilitate the loading, unloading, and transport of a number of larger animals in a single trailer. An example of such is found in Japanese Patent No. 2002-137678, published on May 14, 2002. This reference describes (according to the drawings and English abstract) a horse trailer having three forwardly disposed stalls and three rearwardly disposed stalls. The stall doors have removable drop-pin type hinges that allow the doors to pivot as desired and also serve as latches to secure the doors to one another when closed.

None of the above inventions and patents, taken either singly or in combination, is seen to describe the instant invention as claimed. Thus, an adjustable height trailer solving the aforementioned problems is desired.

SUMMARY OF THE INVENTION

The adjustable height trailer is a fifth wheel-type trailer with a single rear axle and a fifth wheel hitch supporting the forward end. The heights of the rear axle and forward hitch are determined by adjustable suspension systems that allow each end of the trailer to be lowered to place the trailer floor upon the underlying surface to facilitate loading and unloading. The suspension systems are preferably pneumatic, but may be hydraulic or electromechanical, as desired. The adjustable height suspension system is adaptable to trailers having various purposes, e.g., trailers for hauling large livestock (horses, etc.), beverage and other commodity carriers, etc.

A livestock trailer configuration includes opposed side doors for loading and unloading, with one side door disposed toward the rear of the trailer and the opposite side door toward the front. A series of variably positionable partitions or stall walls are installed on tracks along the upper corners of each sidewall of the trailer. The partitions are initially positioned at one end of the trailer, and a first animal is boarded through the entrance door and positioned at the front of the trailer. The forwardmost partition is moved to a position adjacent the first animal. The process continues until the trailer is loaded as desired. When the trailer is unloaded, the exit door is opened and the first animal is led out the exit door. The first partition is moved to the front of the trailer to allow the second animal to exit, with the process continuing until the trailer is unloaded. It will be seen that this arrangement may be reversed if desired, with the forward door being used as the entrance door and the rearward door being used as the exit door. The trailer may be equipped with additional doors as desired, e.g., a rear ramp or the like, etc.

These and other features of the present invention will become readily apparent upon further review of the following specification and drawings.

BRIEF DESCRIPTION OF THE DRAWINGS

FIG. 5B is a right side elevation view in section, showing the rear suspension lowered.

Similar reference characters denote corresponding features consistently throughout the attached drawings.

DETAILED DESCRIPTION OF THE PREFERRED EMBODIMENTS

The present invention relates to an adjustable height trailer. The trailer is particularly valuable when configured as a livestock trailer for transporting horses and/or other large animals, but may be configured for the transport of various commodities as desired.

Figure 1:
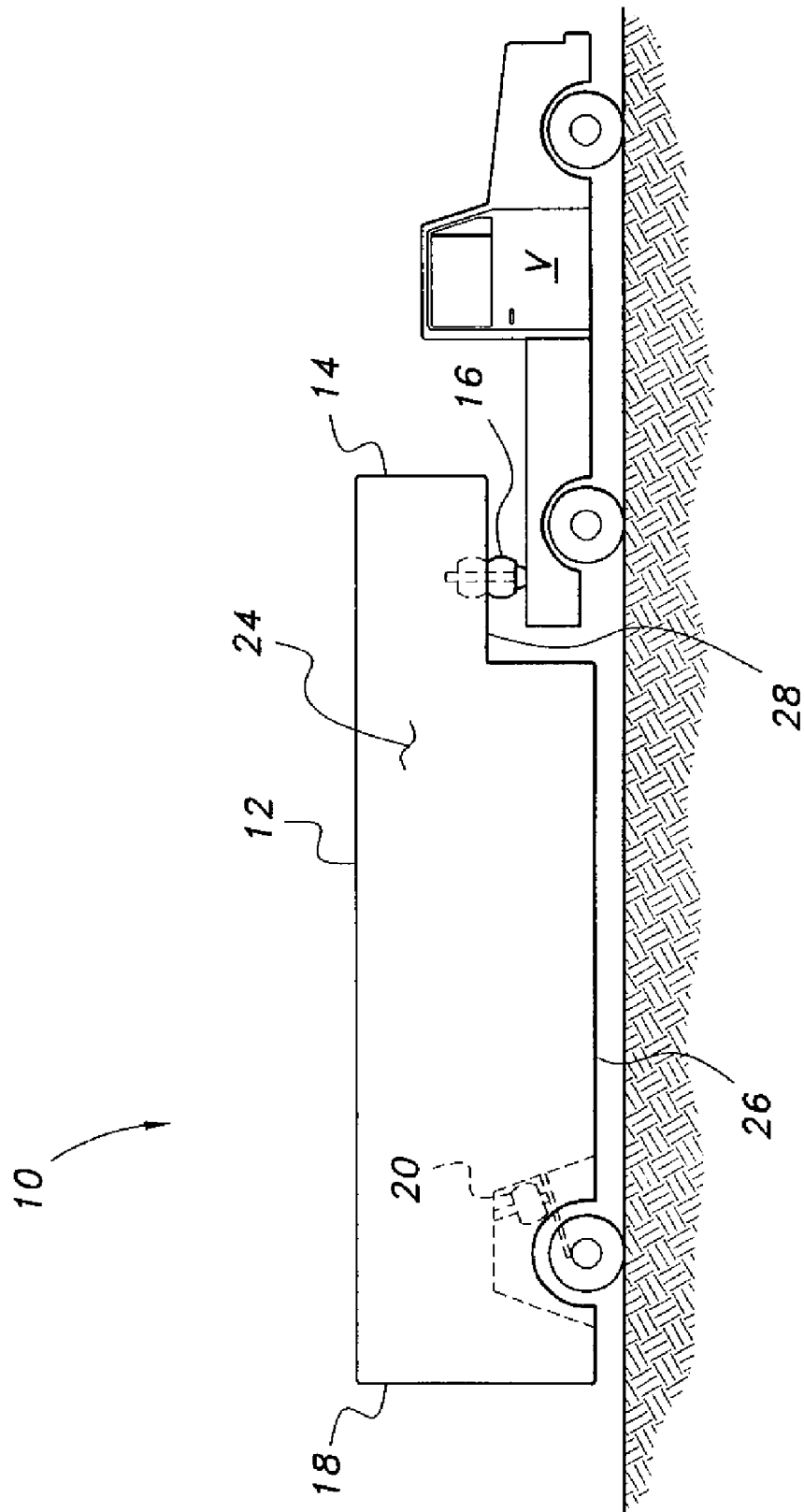
FIG. 1 is a right side elevation view of an adjustable height trailer according to the present invention, showing the suspension raised for road travel.
Figure 2:
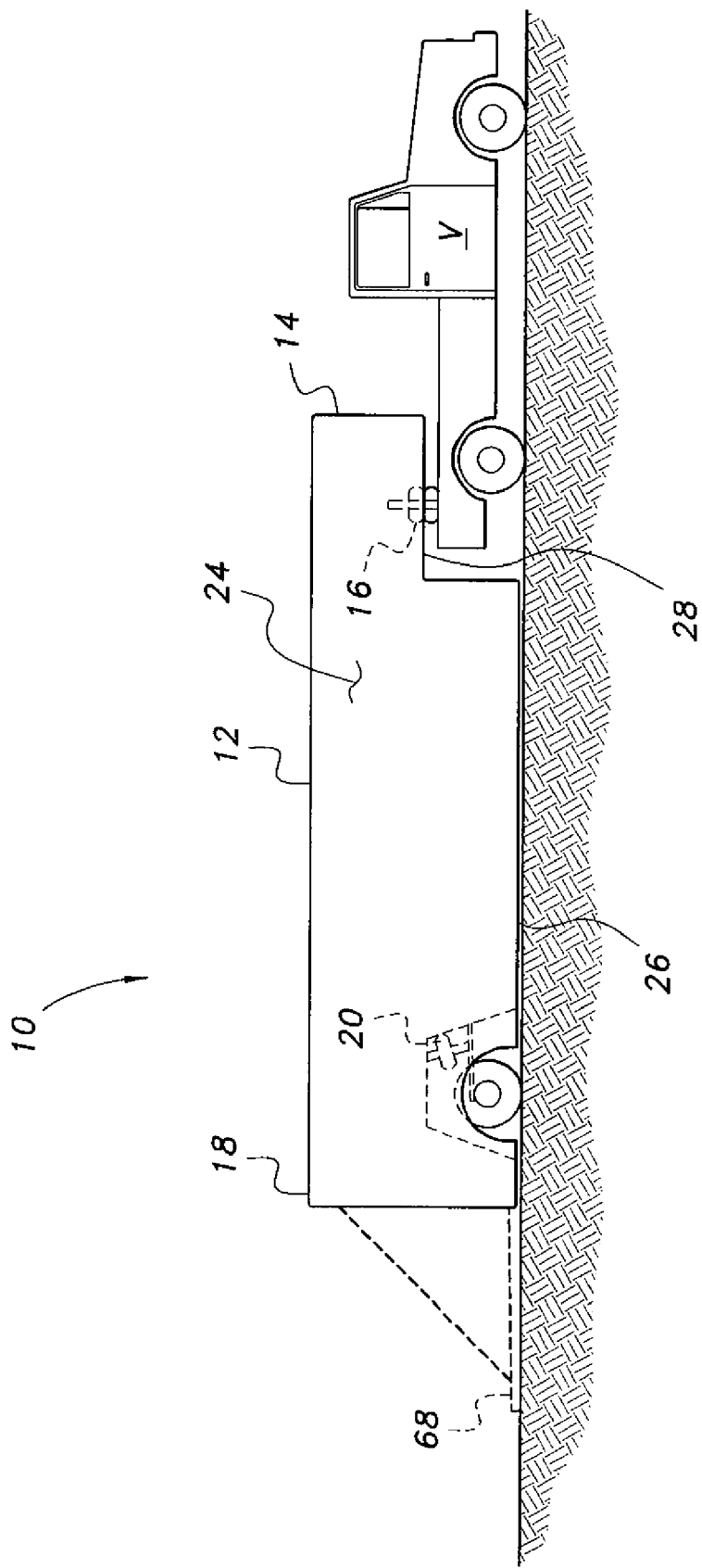
FIG. 2 is a right side elevation view of the trailer of FIG. 1, showing the suspension lowered for loading and unloading.

FIGS. 1 and 2 of the drawings provide right side elevation views of the adjustable height trailer 10, respectively showing the trailer in its raised configuration in FIG. 1 for road clearance while in motion and in its lowered configuration in FIG. 2 to facilitate loading and unloading while parked. Preferably, the trailer floor rests upon the underlying surface when the trailer 10 has been completely lowered on its suspension. The trailer 10 includes a trailer body 12 having a raised forward portion 14 incorporating an adjustable height fifth wheel hitch assembly 16, with the rearward portion 18 of the trailer body having an adjustable height rear suspension assembly 20 installed thereunder. The trailer body 12 includes at least a first side 22, an opposite second side 24, and a floor 26, with these components being shown in section in FIGS. 3A through 4. The trailer body 12 is preferably constructed with a roof, forward end panel, and rearward end panel as well, with the forward and rearward end panels optionally serving as doors for access to those areas of the trailer, but these components are not critical to the invention.

Figure 3A:
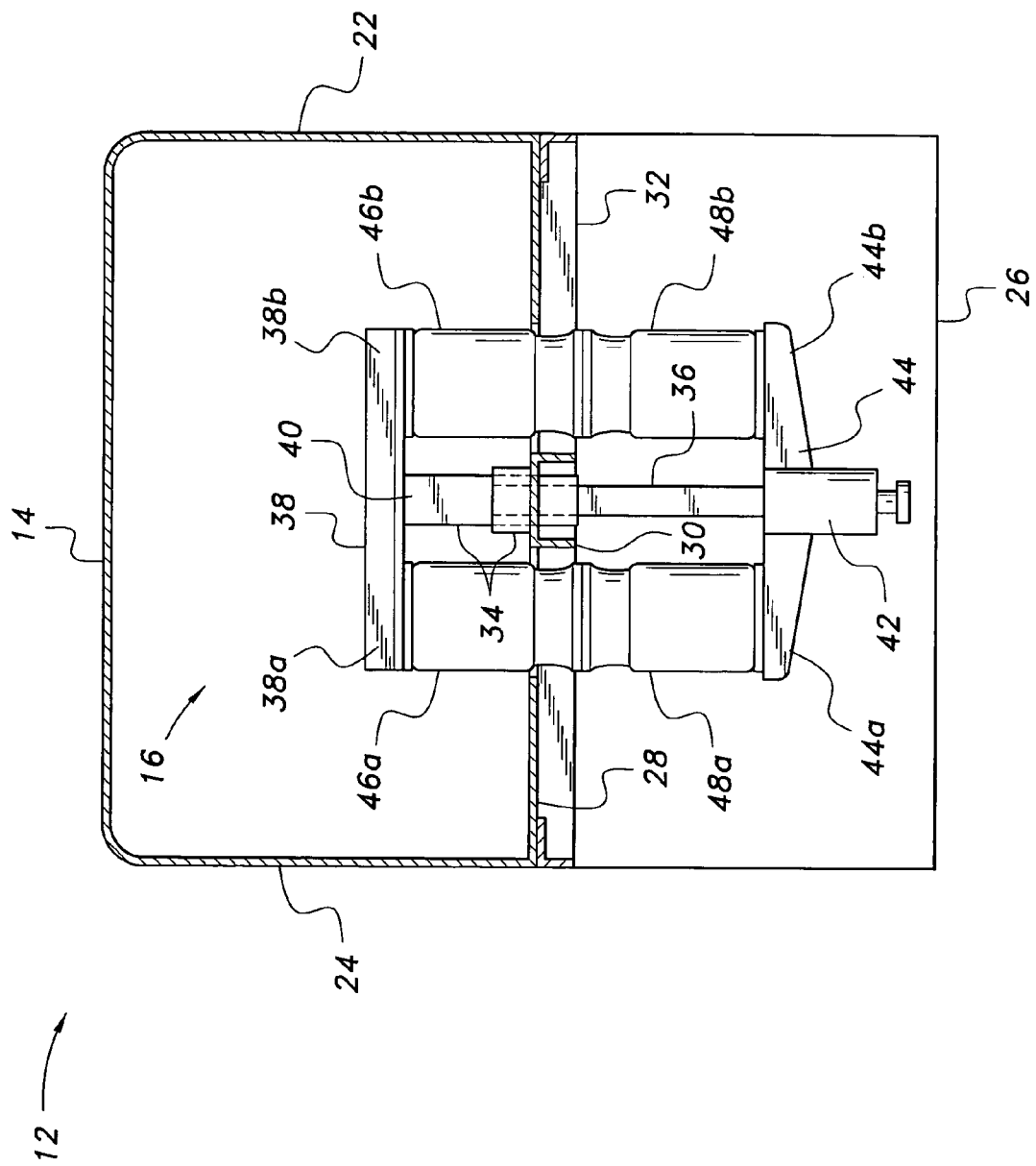
FIG. 3A is an interior elevation view of the forward end of the trailer, looking forward and showing the forward suspension raised.
Figure 3B:
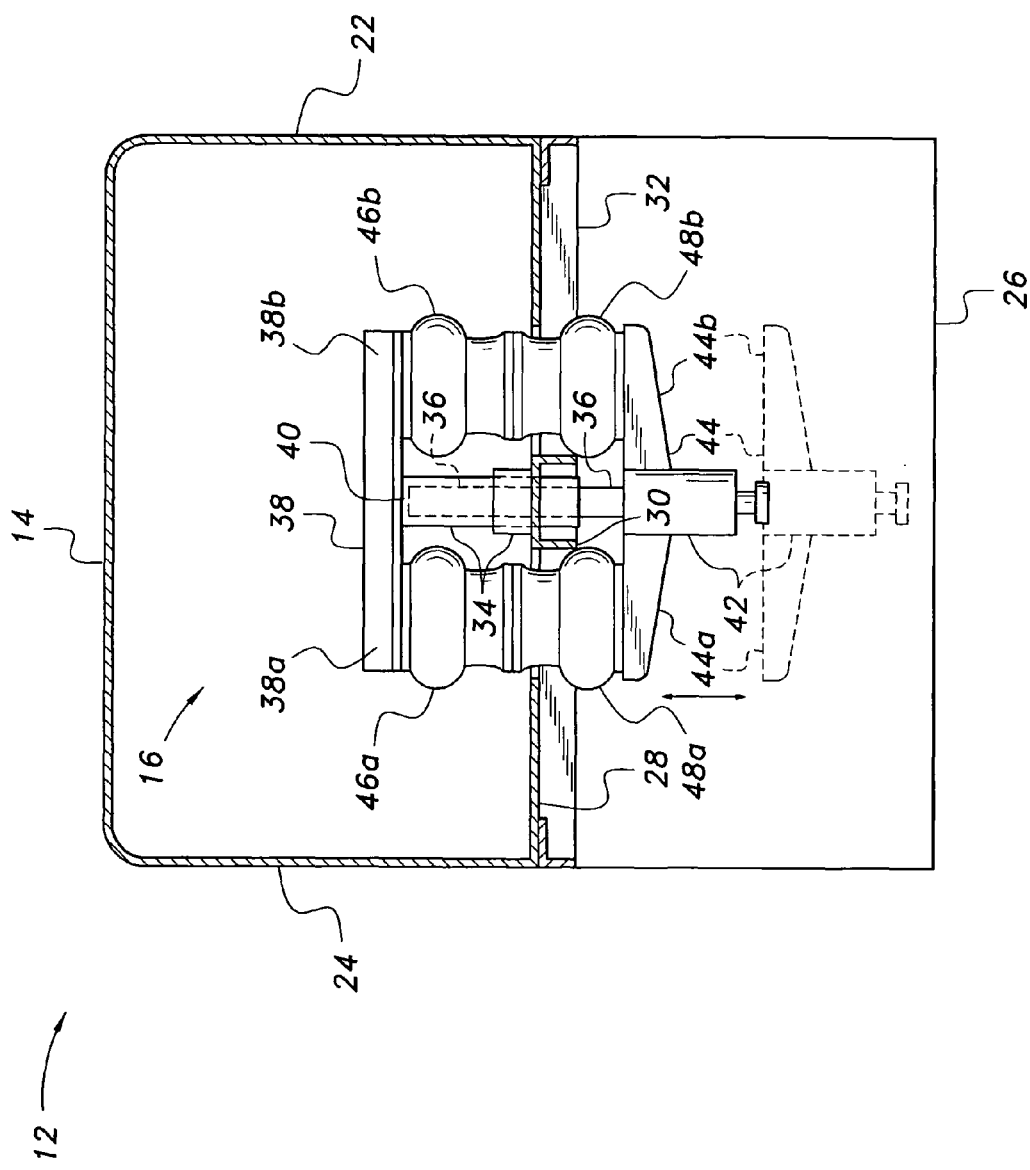
FIG. 3B is an interior elevation view of the forward end of the trailer, looking forward and showing the forward suspension lowered.

FIGS. 3A and 3B are front elevation views in section through the forward portion 14 of the trailer body 12, showing details of the adjustable height hitch assembly 16 respectively in its raised and lowered positions. The trailer floor 26 includes a raised forward portion 28, configured to pass over the bed of a towing vehicle V (e.g., pickup truck, light flatbed truck, etc.), as shown in FIGS. 1 and 2. This raised floor portion 28 includes an opening or passage therethrough, to provide clearance for the adjustable height hitch mechanism 16 from the interior of the trailer to the exterior, below the raised forward floor portion 28. A hitch support structure 30 extends forwardly from a lateral floor frame member 32 to the forward end of the trailer body 12 to bridge the clearance opening for the hitch mechanism, and is shown in section at the center of the hitch assembly 16 in FIGS. 3A and 3B. A tubular hitch guide 34 extends from the hitch support structure 30, with the hitch support structure having a passage therethrough for the vertical hitch post 36 that telescopes within the within the hitch guide 34.

A hitch guide crossmember 38 is affixed to the upper end 40 of the hitch guide 34, with the crossmember 38 having mutually opposed first and second arms 38a and 38b. In a similar manner, the hitch post 36 has a lower portion or end 42, with a hitch post crossmember 44 affixed thereto. The hitch post crossmember 44 includes mutually opposed first and second arms 44a and 44b, parallel to the hitch guide crossmember arms 38a, 38b. The two first arms 38a and 44a have a pair of suspension height adjusters therebetween, respectively 46a and 48a for the upper and lower units, while the opposite two second arms 38b, 44b have a like pair of components 46b, 48b therebetween.

The four suspension height adjusters 46a through 48b are actuated by a common power source, and are shown extended in FIG. 3A to drive the telescoping hitch post 36 downwardly relative to the remainder of the fifth wheel hitch assembly 16 and the forward portion of the trailer body 12. It will be seen that this has the effect of raising the forward end of the trailer body 12 higher above its fifth wheel hitch plate on the towing vehicle V, as shown in FIG. 1, when the trailer 10 is hitched to the towing vehicle. However, when the suspension height adjusters 46a through 48b are retracted, as shown in FIG. 3B, the weight of the forward portion of the trailer body 12 resting on the hitch post 36 causes the forward portion of the trailer body to descend relative to the hitch post, thereby lowering the forward portion of the trailer body 12 on its towing vehicle V as shown in FIG. 3B. The difference in suspension height or travel is shown in FIG. 3B, with the retracted hitch post 36 shown in solid lines and the extended post 36 shown in broken lines.

Preferably, the suspension height adjusters 46a through 48b provide sufficient suspension travel or height adjustment to allow the forward portion of the trailer floor 26 to rest on the underlying surface, as shown in FIG. 2 of the drawings. An experimental prototype of the present adjustable height trailer 10 has been constructed, and it has been found that a series of four pneumatic suspension airbags are suitable for the suspension units 46a through 48b. The use of two such airbags stacked atop one another, e.g., units 46a and 48a, has been found to provide sufficient suspension travel for good ground clearance when inflated and to allow the trailer floor to rest directly upon the underlying surface when collapsed. The use of two such stacked pairs provides sufficient lift force to support the forward end of the trailer 10 when fully loaded, and provides greater stability than a single stacked pair. It will be seen that other adjustable height suspension principles may be used in lieu of or in addition to such a pneumatic system. For example, a conventional hydraulic jack could be installed with the present pneumatic system or other resilient spring system (leaf, coil, etc.) to provide the height adjustment, or an electromechanical screw jack arrangement could be incorporated with the resilient suspension system provided by a pneumatic or spring system. The power source for any of the above systems, whether they are pneumatic, hydraulic, or electromechanical, is conventional and need not be described further here.

Figure 4:
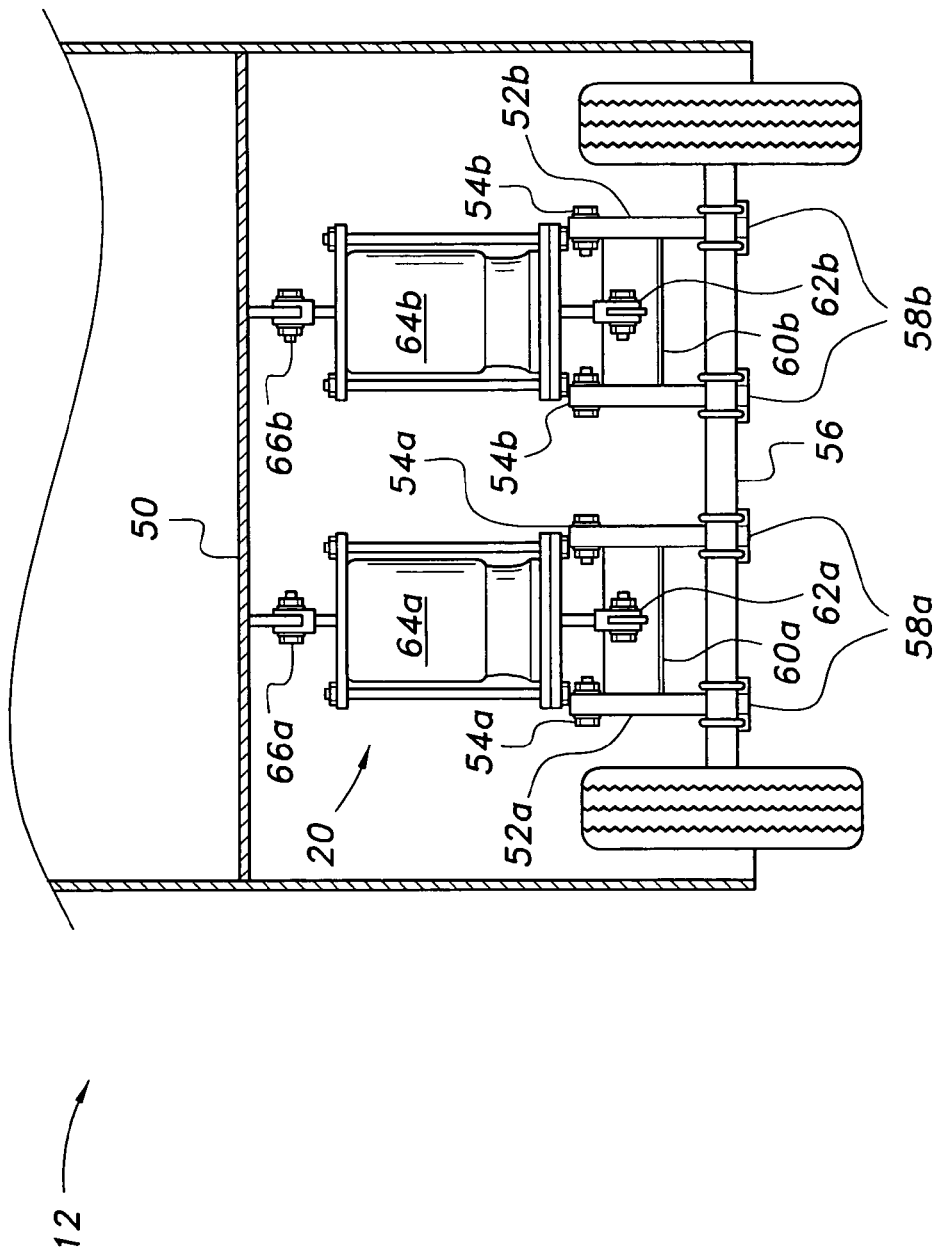
FIG. 4 is an interior elevation view of the rearward end of the trailer, looking forward and showing details of the rear suspension.

FIGS. 4 through 5B illustrate the rear suspension system 20 used with the adjustable height trailer 10. The floor 26 includes a raised rearward portion or area 50, with the volume therebeneath providing room for the rear suspension assembly 20. First and second trailing arm assemblies, respectively 52a and 52b, have forward ends 54a, 54b pivotally attached to the trailer floor 26 (actually to reinforced points thereon) beneath the raised portion 50 thereof, e.g., extending from the sloped forward portion between the lower floor 26 and raised portion 50. The rear axle 56 is attached to (e.g., shackles, etc.) and extends across the opposite rearward ends 58a, 58b of the trailing arm assemblies. A medially disposed tie plate, respectively 60a and 60b, extends across each of the trailing arm assemblies 52a and 52b. The plates 60a, 60b also serve as pivotal attachment points for the lower ends 62a and 62b of the rear suspension height adjusters 64a and 64b. The opposite upper ends 66a, 66b of the rear suspension height adjusters are pivotally attached to the underside of the raised rear floor portion 50, or more specifically to reinforced points attached thereto.

Figure 5A:
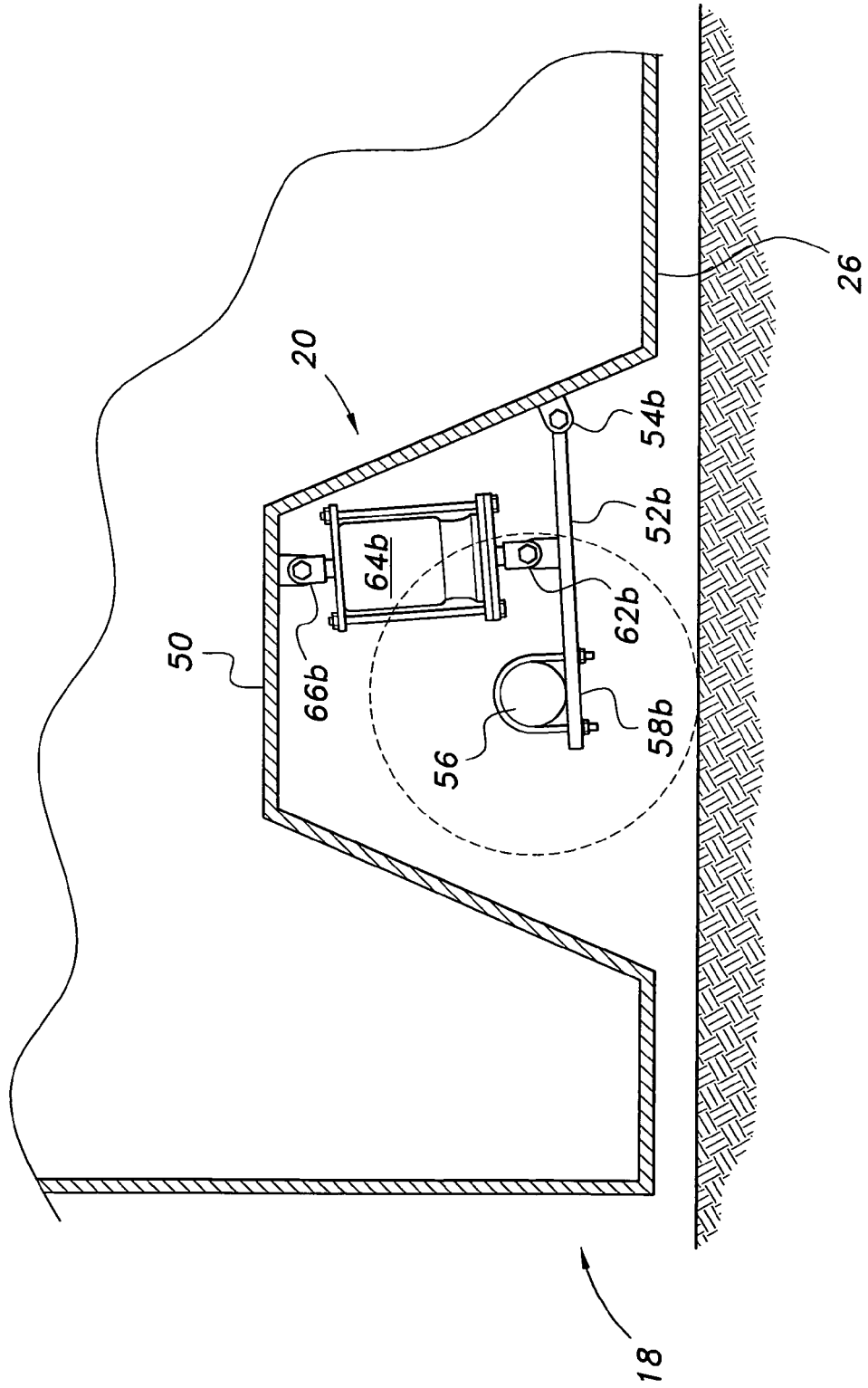
FIG. 5A is a right side elevation view in section, showing the rear suspension raised.

FIGS. 5A and 5B respectively show the rear suspension system 20 operates to raise and lower the rear portion of the trailer body 12. These two drawings Illustrate the right or second side or half of the rear suspension system, with the opposite left or first side being understood to operate identically and in unison with the right or second side. In FIG. 5A, the height adjuster 64b is fully extended, thereby pushing downwardly on its attach point 62b to the trailing arm 52b to lower the rear 58b of the trailing arm as shown to lift the rear portion 18 of the trailer body above the underlying surface. The attachment of the height adjusters 64a, 64b to the tie plates 60a, 60b extending across the medial portions of their trailing arm assemblies results in the travel of the rear or axle attachment ends 58a, 58b of the arm assemblies being about twice that of the linear extension of the height adjusters 64a, 64b. Thus, only a single height adjuster is required for each of the two trailing arm assemblies 52a and 52b to provide the same difference in height adjustment as provided by the stacked pairs of adjusters at the fifth wheel hitch assembly 16 at the opposite forward end of the trailer.

When the trailer 10 is to be lowered as shown in FIG. 5B, the height adjusters 64a, 64b are retracted or collapsed to reduce their heights, thus allowing the medial portions of the trailing arms 52a, 52b to approach the upper attach points 66a, 66b of the adjusters. This allows the distal rearward ends 58a, 58b of the trailing arm assemblies to swing upwardly toward the raised floor area 50 as well, thus allowing the rear axle 56 to swing upwardly into the well defined by the raised floor area 50 and its depending forward and rearward panels. The weight of the rear portion 18 of the trailer causes the trailer to drop downwardly, as shown in FIG. 5B. Preferably, sufficient travel is provided in the suspension height adjusters 64a and 64b to allow the trailer floor 26 to lower sufficiently to rest directly upon the underlying surface, as in the case of the forwardly disposed fifth wheel hitch assembly 16. As in the case of the fifth wheel hitch assembly, the rear suspension assembly 20 preferably employs pneumatic air bag units as the adjustable height suspension units 64a and 64b. However, other suspension mechanisms employing other principles of operation may be installed as desired.

FIGS. 6A through 6E illustrate a second embodiment of the adjustable height trailer, designated as trailer 110. The trailer 110 is shown as a top plan view in section with the roof removed in FIGS. 6A through 6E, in order to show various internal details. The reference numerals used below for the description of the trailer 110 are each one hundred greater than the corresponding component of the first embodiment trailer 10 of FIGS. 1 through 5B, e.g., trailers 10 and 110 having trailer bodies 12 and 112, etc.

The trailer 110 is configured as a livestock trailer for the transport of large animals, e.g., horses, etc. The livestock trailer 110 includes a raised front portion 114 having a fifth wheel hitch assembly 116, in the manner of the first embodiment trailer 10. Preferably, the fifth wheel hitch assembly 116 is essentially identical to that of the trailer 10, to allow the forward portion 114 of the trailer 110 to be raised and lowered in the manner of the trailer 10. The opposite rear portion 118 contains a rear suspension system 120, preferably structurally and functionally essentially identical to the rear suspension 20 of the trailer 10 of FIGS. 1 through 5B to allow the rear portion of the trailer 110 to be lowered, along with the front, to place the trailer floor in direct contact with the underlying surface to facilitate loading and unloading the trailer.

The trailer 110 includes mutually opposed first and second sides, respectively 122 and 124, each having a door therein. The first wall 122 has an entrance door 170 installed near the rear portion 118 of the trailer, but forwardly of the raised rear suspension clearance portion of the trailer floor 126. The second wall has an exit door 172 installed near the front portion 114 of the trailer 110, but slightly rearwardly of the forward portion of the trailer with its raised floor 126. This configuration allows large livestock, e.g., horses H1, H2, etc., to be boarded through the rearward entrance door 170 and moved toward the front of the trailer 110 as desired, and to exit the trailer through the forwardly disposed exit door 172 on the opposite side of the trailer. In this manner, the animals do not have to back out of the trailer, but always move forward while entering, moving through, and exiting the trailer. This is much easier on the animals, and tends to avoid upsetting them and/or causing them to "spook" and injure themselves.

The side door configuration illustrated in FIGS. 6A through 6E results in the animals departing the trailer 110 away from traffic, where traffic travels in the right lane and parks along the right side of the road, as in the U.S. It will be seen that the entrance and exit doors may be reversed, with animals entering through a door in the second side 124 and exiting through a door in the first side 122, if so desired. The rear portion of the trailer may include a drop-down ramp or rear door, as shown by the drop-down door or ramp 68 in FIG. 2 in broken lines, for the trailer 10. The drop-down door 68 is not used for boarding and disembarking livestock due to its location on the trailer, but may be used to access equipment stored in that portion of the trailer behind the rear suspension assembly.

At least one, and preferably a series of, adjustably positionable partitions are provided within the trailer 110. In the example of FIGS. 6A through 6E, a series of three such partitions or stall walls 174a through 174c are provided, with these partitions defining a series of up to four livestock stalls within the trailer 110 in combination with a fixed forward wall 176 and a fixed rearward wall 178. More or fewer such partitions may be installed in the trailer, depending upon the length of the trailer and its interior room. It will be noted that the partitions 174a through 174c, as well as the forward and rearward walls 176 and 178, are disposed somewhat diagonally across the trailer interior, i.e., the ends joining the second side 124 of the trailer are positioned somewhat forwardly of the ends joining the first side 122 of the trailer. As in the case of the first and second side doors 170 and 172, this may be reversed during the construction of the partitions and trailer, if so desired. The diagonal angles of the movable partitions 174a through 174c and the forward and rearward fixed walls 176 and 178 may be reduced from that shown in FIGS. 6A through 6E to result in more forwardly and rearwardly oriented stalls according to the width and size of the trailer, if so desired.

A first upper track 180 is installed along the upper edge of the first wall 122, with an opposite second upper track 182 installed along the upper edge of the opposite second wall 124. These two tracks 180, 182 support the rollers or wheels 184 extending from the respective first and second ends 186 and 188 of the movable partitions 174a through 174c. It will be noted that the partition or stall wall ends 186 and 188 are angled as required so the wheel axles are normal to the longitudinal axes of the tracks 180 and 182, to allow the planes of the partition wheels 184 to remain in alignment with the tracks.

Figure 6A:
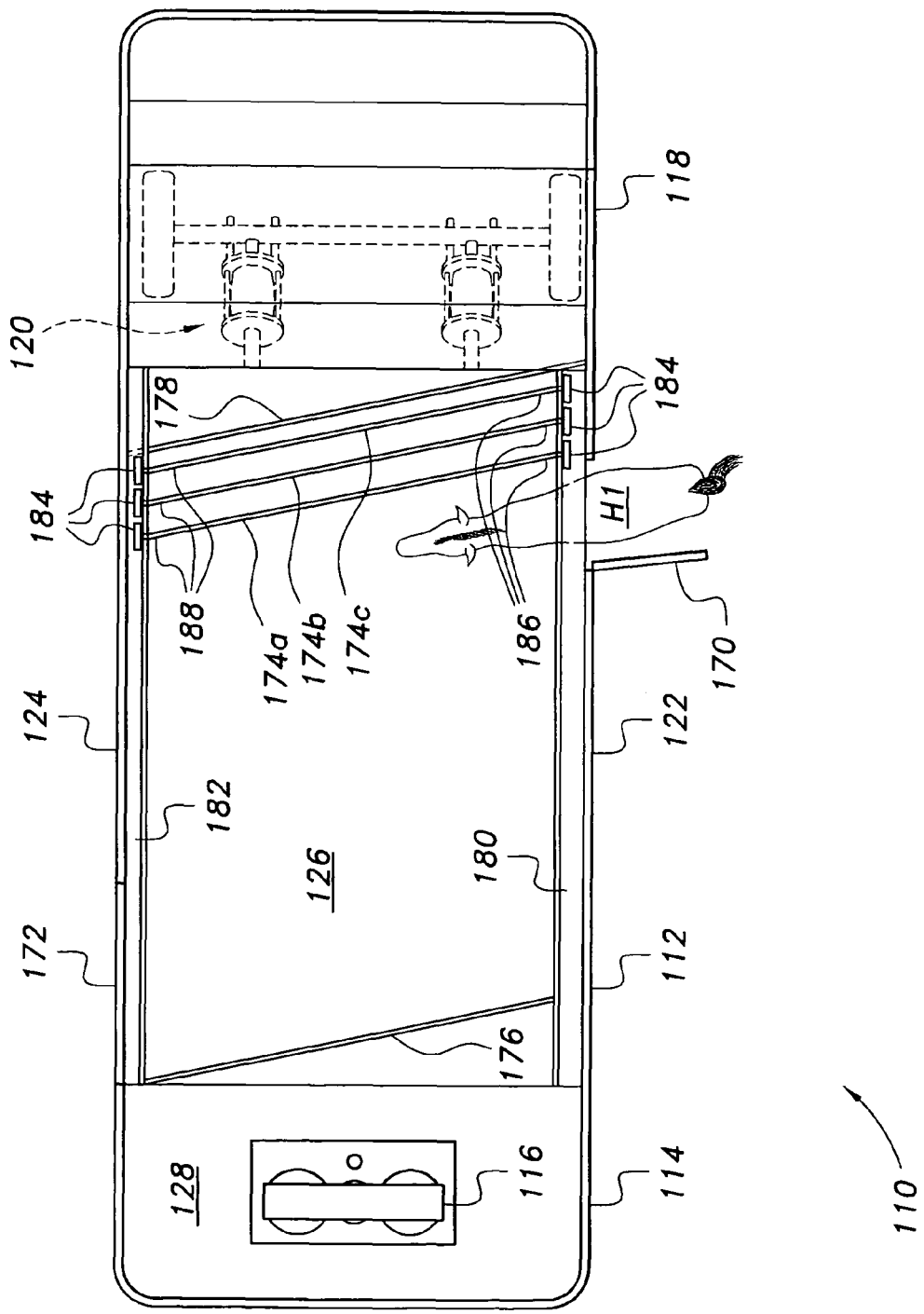
FIGS. 6A, 6B, 6C, and 6D are top plan views in section of a livestock trailer embodiment of the present adjustable height trailer, showing the loading of livestock therein.
Figure 6B:
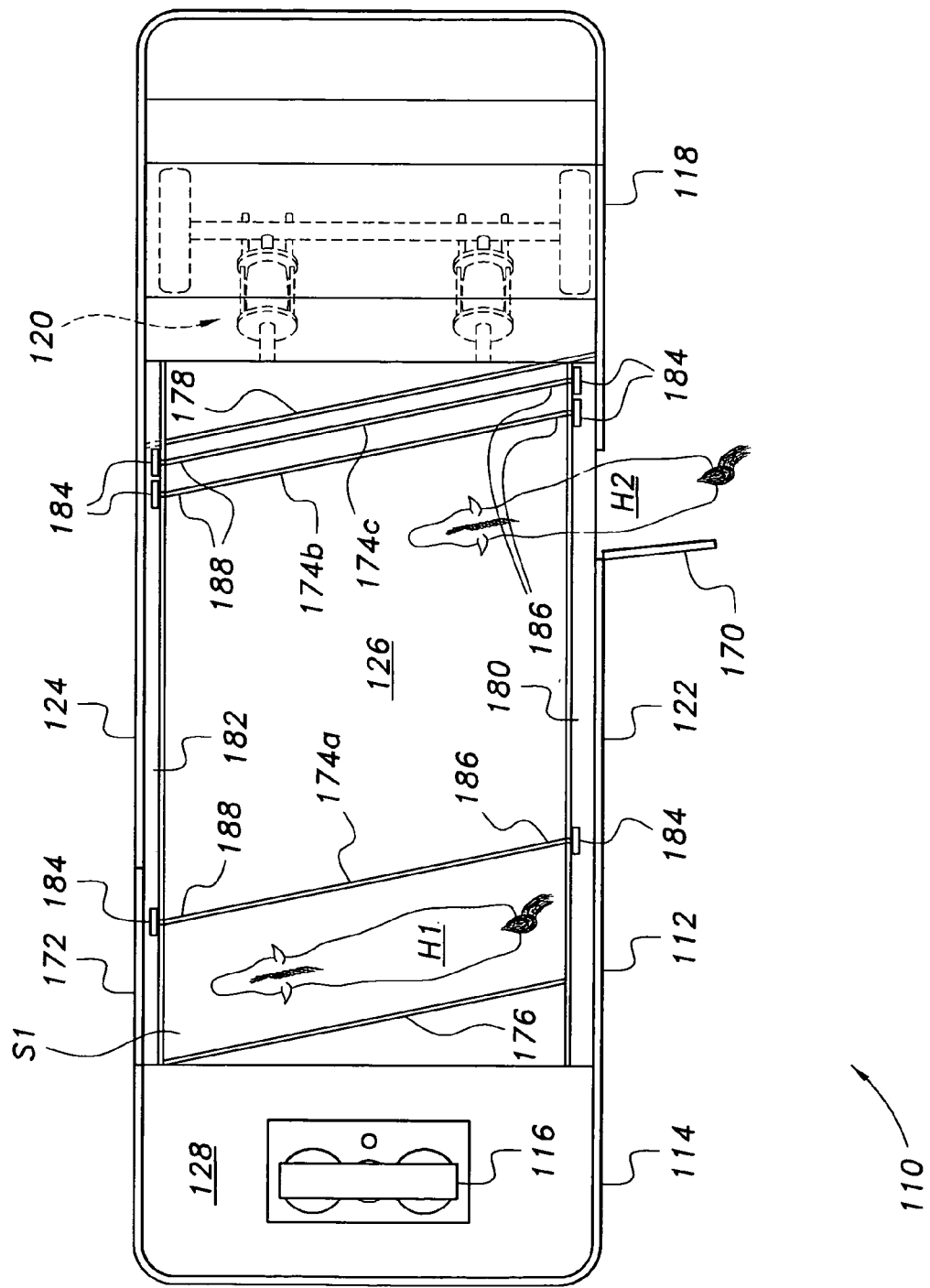

FIG. 6A shows the initial boarding configuration of the livestock trailer 110, with all of the movable partitions 174a through 174c moved to the extreme rear of the interior space of the trailer, with their first ends 186 positioned rearwardly of the first side door 170. In this manner, the first horse H1 to be loaded aboard the trailer 110 enters forwardly of all of the partitions 174a through 174c. The first horse H1 is led toward the front of the trailer interior and positioned adjacent to the fixed front wall 176. The first movable partition 174a is then rolled forward on its tracks 180 and 182, and secured into place to form a first stall S1 between the fixed forward wall 176 and the first partition 174a for the first horse H1, generally as shown in FIG. 6B of the drawings.

At this point, the second horse H2 is led into the trailer through the open entrance doorway of the door 170, and positioned with its left side adjacent the first movable partition 174a. The second movable partition 174b is rolled into position adjacent the right side of the second horse H2 to form a second stall S2 between the first and second movable partitions 174a and 174b, as shown in FIG. 6C.

Figure 6C:
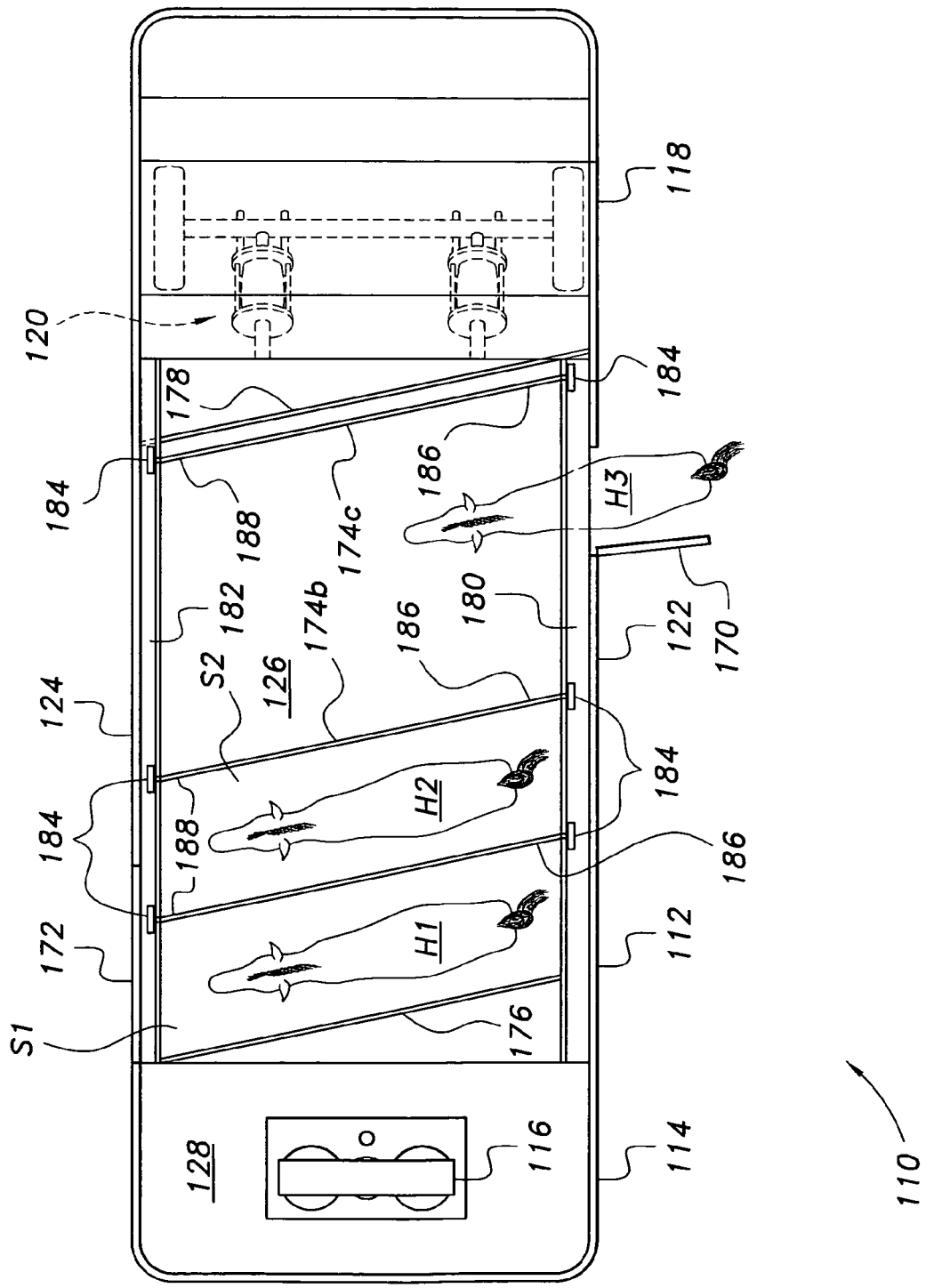
Figure 6D:
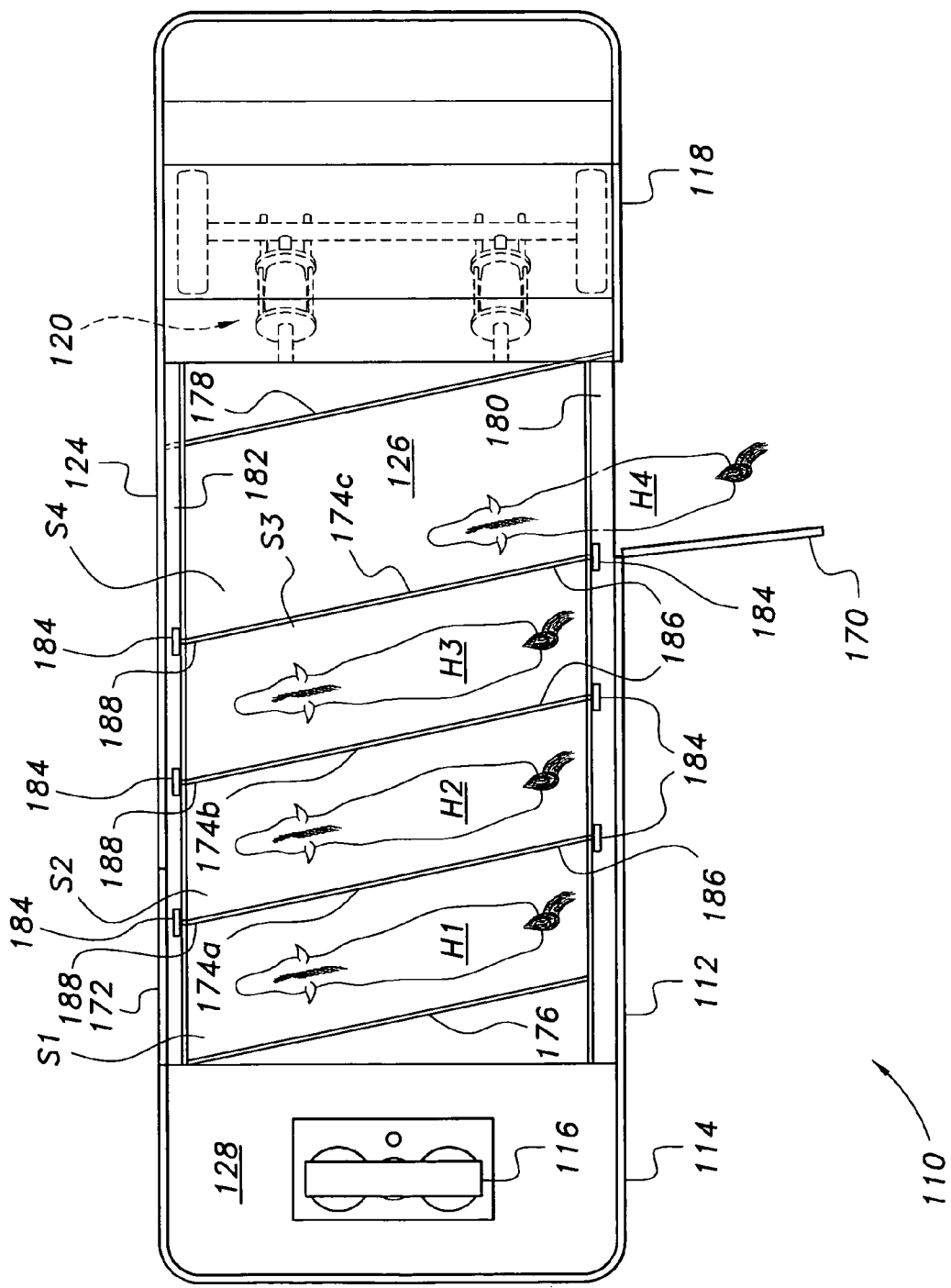

A third horse H3 is shown entering the open doorway in FIG. 6C. This third horse is led to a position adjacent the second movable partition 174b, and the third movable partition 174c is rolled forward and secured in place along the right side of the third horse H3 to define a third stall S3 between the second and third movable partitions 174b and 174c, as shown in FIG. 6D. This drawing also shows a fourth horse H4 entering the trailer into the fourth stall S4 formed between the third movable partition 174c and the fixed rear wall 178. The loading process is complete when the fourth horse H4 is on board the trailer and the entrance door 170 is closed.

Figure 6E:
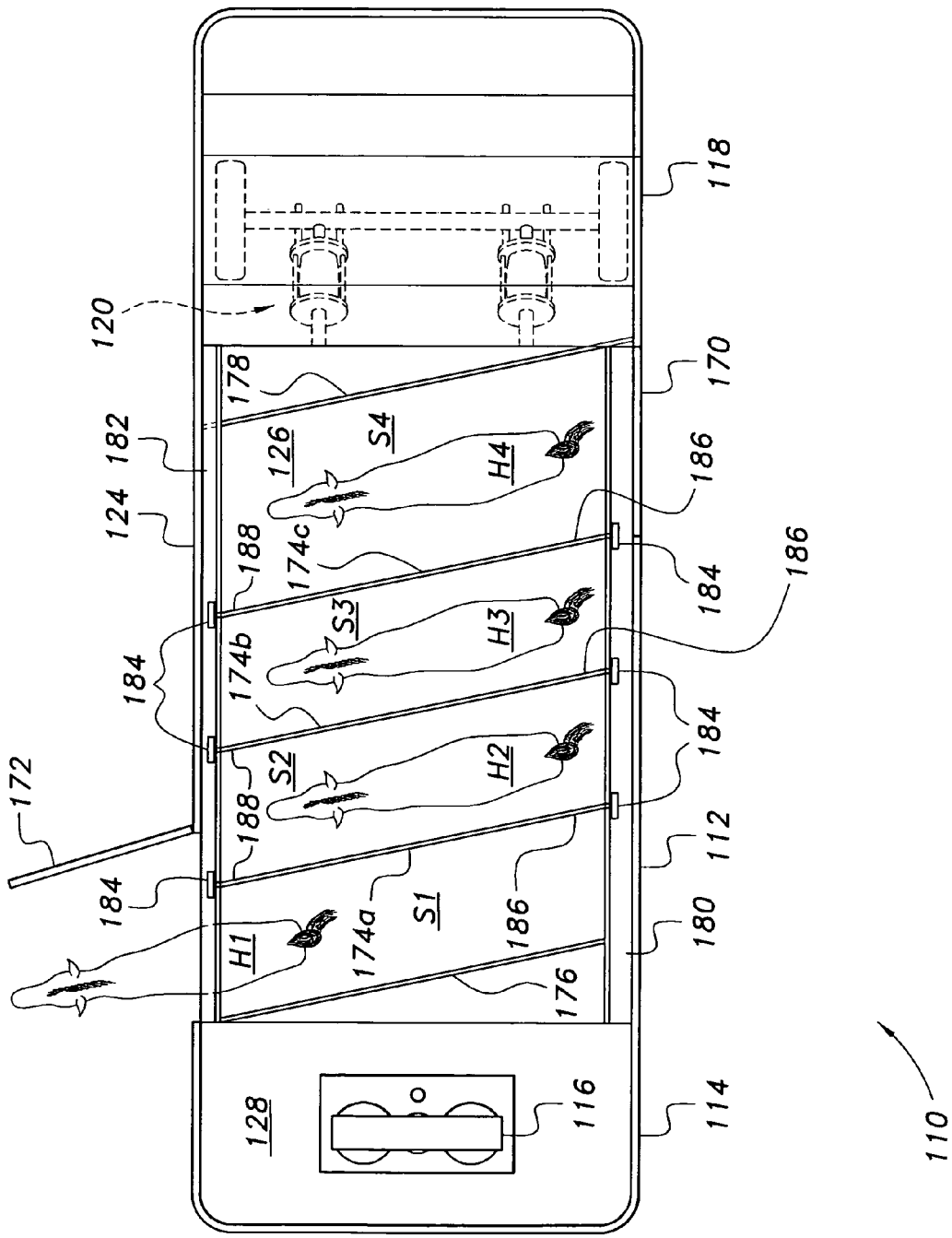
FIGS. 6E, 6F, 6G, and 6H are top plan views in section of a livestock trailer embodiment of the present adjustable height trailer, showing the unloading of livestock therefrom.
Figure 6F:
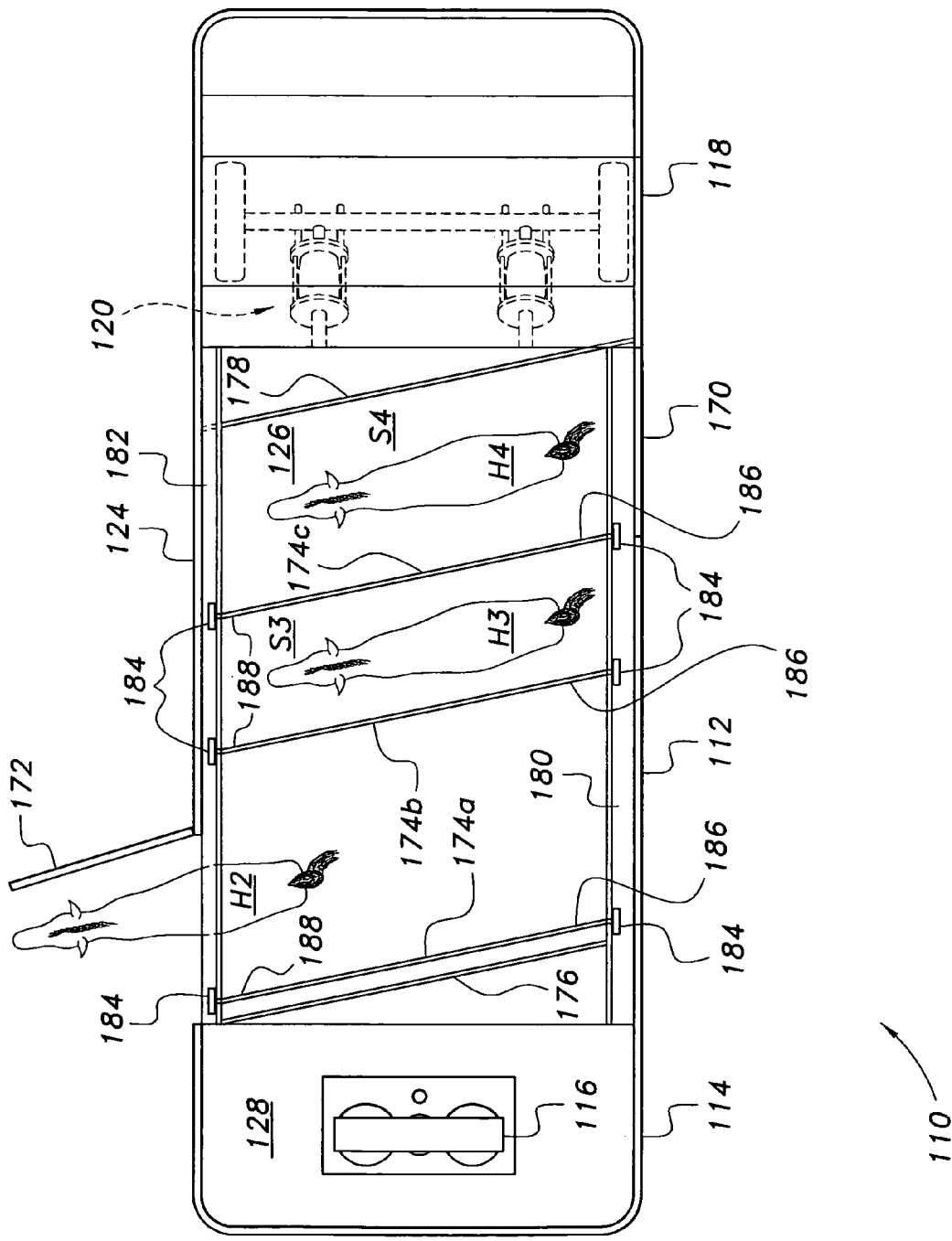

FIGS. 6E through 6H illustrate the unloading process for the livestock trailer 10. The unloading door 172 is located directly at the front of the first stall S1 when the trailer is loaded, so the first horse H1 may be led directly out of the open exit doorway as shown in FIG. 6E. Once the first horse H1 has left the trailer, the first movable partition 174a is rolled forwardly on its two overhead tracks 180 and 182 to a point immediately adjacent the forward fixed wall 176, thereby removing the left or forward side of the second stall S2 to allow the second horse H2 to move forward and exit the trailer through the exit doorway. This is shown in FIG. 6F of the drawings.

Figure 6G:
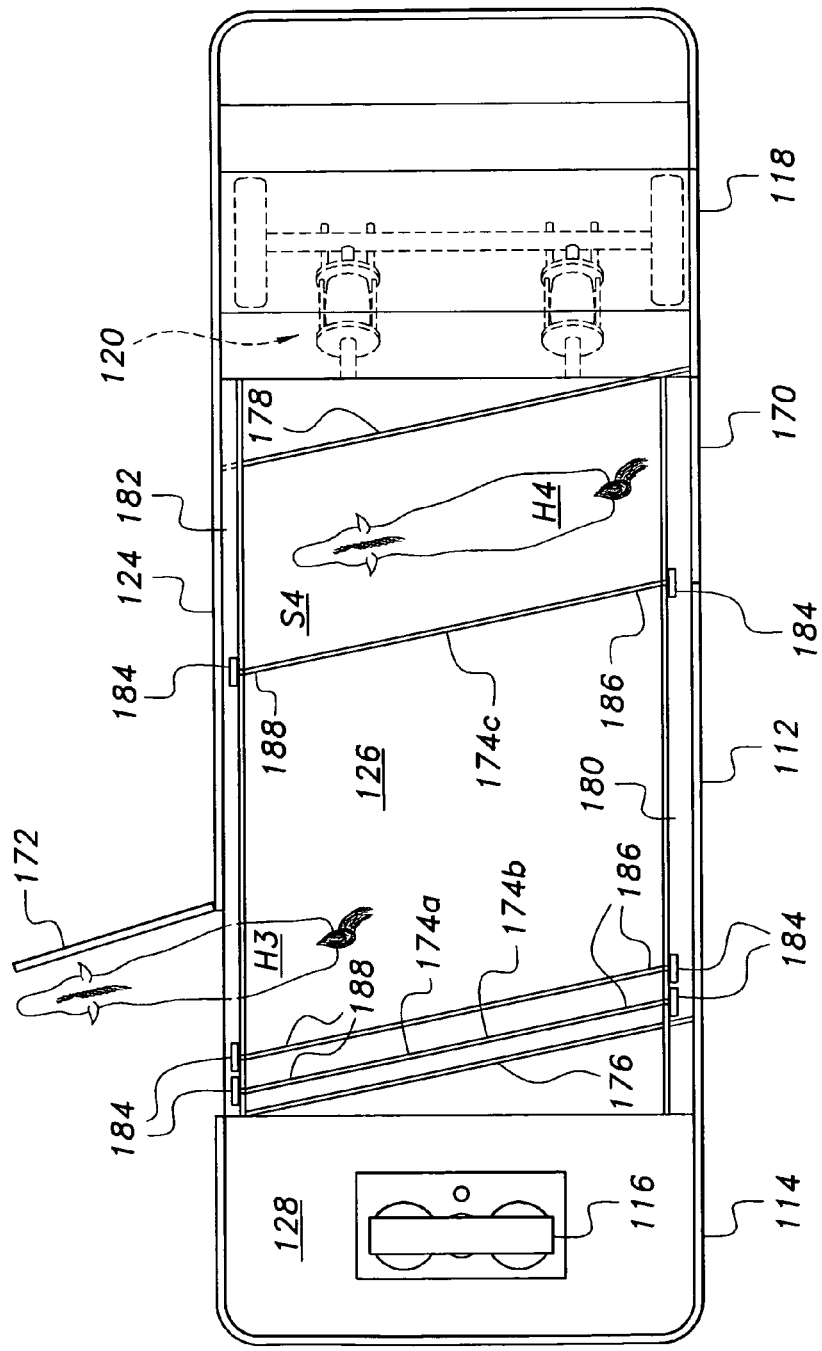

The unloading process continues as shown in FIG. 6G. In this Fig., the second movable partition 174b has been rolled forward to a point immediately adjacent the first movable partition 174a, thus removing the left or forward wall of the third stall and opening the area forward of the third movable partition 174c up to the forwardly positioned exit doorway. This allows the third horse H3 to be led through the open exit doorway at the open door 172, to exit the trailer.

Figure 6H:
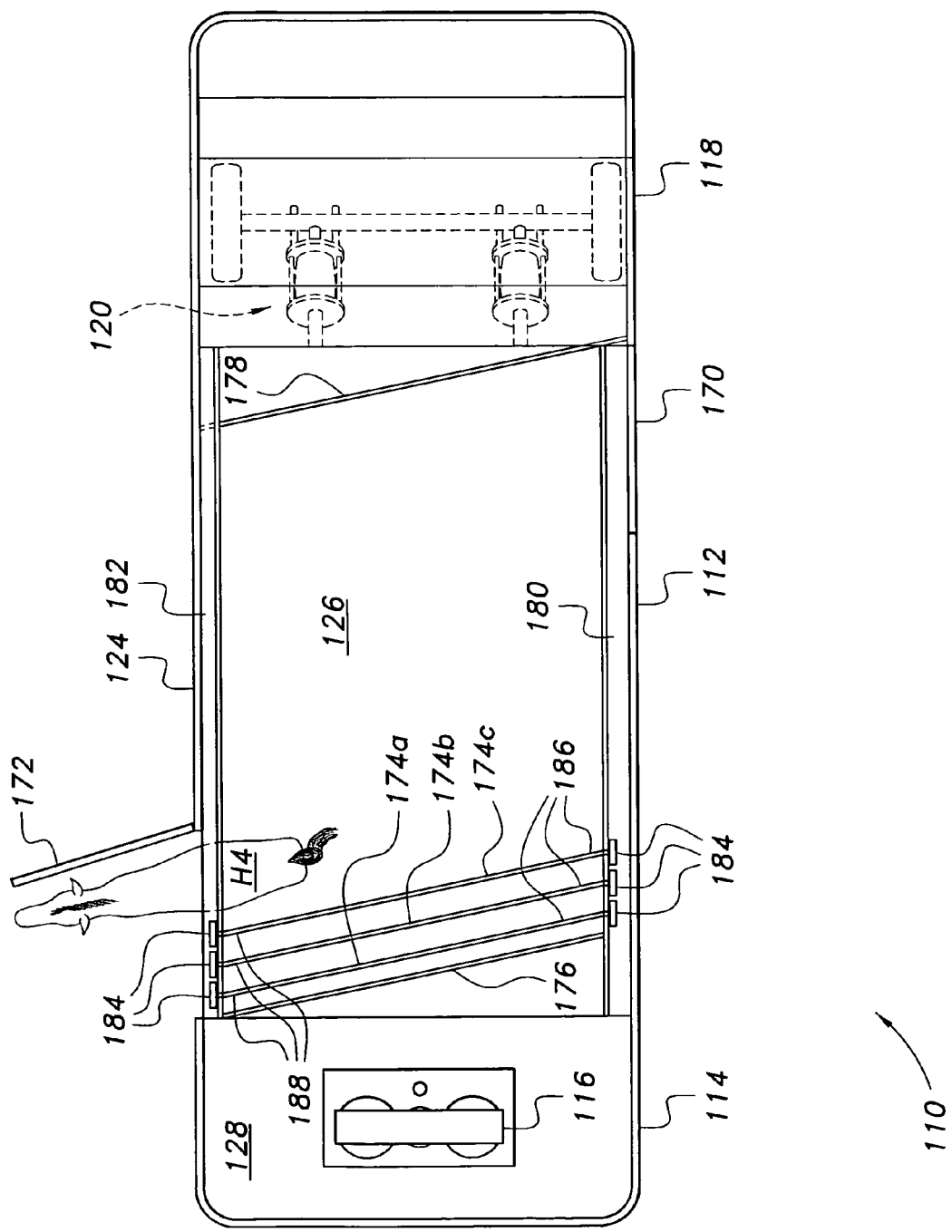

Finally, the third movable partition 174c is rolled forward to a position immediately adjacent the forwardly disposed third partition 174b. This removes the left or forward side of the fourth stall, opening the trailer from the rear wall 178 to the exit door 172. The fourth horse H4 may thus be led from the trailer, as shown in FIG. 6H. Once all the horses have been removed from the trailer, the three movable partitions 174a through 174c are rolled rearwardly to a point adjacent the fixed rear wall 178 as shown in FIG. 6A to ready the trailer 110 for loading once again.

Accordingly, the livestock trailer 110 provides a much more efficient means of transporting horses and/or other large animals. It will be seen that the trailer configuration of FIGS. 6A through 6H is exemplary, and that more or fewer movable partitions may be provided (depending upon the length of the trailer) to define a greater or smaller number of stalls when the partitions are deployed. The livestock trailer 110 may incorporate a conventional suspension system if so desired, but the use of the adjustable height suspension of the trailer 10 with the livestock trailer 110 greatly improves the utility of the trailer 110 by allowing the trailer floor 126 to rest directly upon the underlying surface during loading and unloading. This greatly facilitates the loading and unloading of large animals into and from the trailer, as they do not have to climb or descend a ramp from one elevation to another. The forward movement of the animals through the trailer from entrance to exit also greatly improves the process by not requiring the animals to back through a relatively narrow doorway or the like, particularly when moving up or down a ramp.

It will be seen that the adjustable height suspension of the trailer 10 is adaptable to innumerable trailer configurations. While a large side door is not shown in the drawings of the present disclosure, such doors are conventional on one or both sides of many types of trailers and may be incorporated with the trailer 10 of the present disclosure. Such a trailer configuration is quite useful as a beverage delivery trailer, for example. Such beverage delivery trucks and trailers commonly have large side doors to enable the delivery person to access cases of beverages (e.g., beer, soda, etc.) from various locations along the length of the trailer. However, conventional trailers require the delivery person to manually lift the cases of beverage from the trailer to a handcart or the like. A beverage trailer equipped with the height adjustable suspension will allow the trailer to be lowered so that its floor is essentially at curb height, thus greatly facilitating the loading and unloading process.

It is to be understood that the present invention is not limited to the embodiments described above, but encompasses any and all embodiments within the scope of the following claims.

I claim:

1. An adjustable height trailer, comprising:
    a trailer body having a forward portion, a rearward portion opposite the forward portion, a first side, a second side opposite the first side, and a floor having a raised portion at the forward portion and a raised portion at rearward portion of the trailer body;
    an adjustable height fifth wheel hitch assembly disposed at the forward portion of the trailer body, the fifth wheel hitch assembly including:
        a tubular hitch guide extending upwardly from the raised portion of the floor, the hitch guide further having an upper end;
        a laterally disposed hitch guide crossmember extending across the upper end of the hitch guide, the crossmember having mutually opposed first and second arms;
        a hitch post telescopically disposed within the hitch guide, the hitch post having a lower portion;
        a laterally disposed hitch post crossmember extending across the lower portion of the hitch post, the crossmember having mutually opposed first and second arms;
        first upper and lower suspension height adjusters disposed between the first arms of the hitch guide crossmember and the hitch post crossmember; and
        second upper and lower suspension height adjusters disposed between the second arms of the hitch guide crossmember and the hitch post crossmember, wherein the first and second upper and lower height adjusters comprise adjustable, resilient airbag suspension units;
    an adjustable height rear suspension disposed at the rearward portion of the trailer body, the rear suspension including:
        first and second trailing arm assemblies, each of the assemblies having a forward end pivotally attached to the floor beneath the raised portion thereof, a medial portion, and a rearward end opposite the forward end;
        a rear axle disposed across the rearward end of each of the trailing arm assemblies; and
        a suspension height adjuster disposed between the medial portion of each of the trailing arm assemblies and the raised portion of the floor, wherein each height adjuster comprises an adjustable, resilient airbag suspension unit;
    a first door installed in the first side at the rearward portion of the trailer body;
    a second door installed in the second side at the forward portion of the trailer body; and at least one adjustably positionable partition extending between the first side and the second side, the partition, forward portion of the trailer body, and rearward portion of the trailer body defining at least one livestock stall disposed therein.

2. The adjustable height trailer according to claim 1, further comprising a fold-down rear door disposed at the rearward portion of the trailer body.

3. An adjustable height trailer, comprising:
a trailer body having a forward portion, a rearward portion opposite the forward portion, a first side, a second side opposite the first side, and a floor;
an adjustable height fifth wheel hitch assembly disposed at the forward portion of the trailer body;
a hitch post adjustably depending from the fifth wheel hitch assembly;
an adjustable height rear suspension disposed at the rearward portion of the trailer body; and
a single rear axle disposed across the adjustable height rear suspension.

4. The adjustable height trailer according to claim 3, wherein each of the sides has an upper edge, the trailer further comprising:
a first door installed in the first side adjacent the rearward portion of the trailer body;
a second door installed in the second side adjacent the forward portion of the trailer body;
mutually opposed first and second partition tracks respectively disposed along the upper edge of the first side and second side; and
at least one adjustable partition extending between the first side and the second side, the partition having a first end movably installed in the first partition track and a second end movably installed in the second partition track, the partition, forward portion of the trailer body, and rearward portion of the trailer body defining at least one livestock stall disposed therein.

5. The adjustable height trailer according to claim 3, wherein the floor has a raised portion at the forward portion of the trailer body, the trailer further comprising:
a tubular hitch guide extending upwardly from the raised portion of the floor, the hitch guide further having an upper end;
a laterally disposed hitch guide crossmember extending across the upper end of the hitch guide, the crossmember having mutually opposed first and second arms;
the hitch post being telescopically disposed within the hitch guide, the hitch post having a lower portion;
a laterally disposed hitch post crossmember extending across the lower portion of the hitch post, the crossmember having mutually opposed first and second arms;
first upper and lower suspension height adjusters disposed between the first arms of the hitch guide crossmember and the hitch post crossmember; and
second upper and lower suspension height adjusters disposed between the second arms of the hitch guide crossmember and the hitch post crossmember.

6. The adjustable height trailer according to claim 3, wherein the floor has a raised portion above the rear suspension, the trailer further comprising:
first and second trailing arms, each of the arms having a forward end pivotally attached to the floor beneath the raised portion thereof, a medial portion, and a rearward end opposite the forward end;
a rear axle disposed across the rearward end of each of the trailing arms; and
a suspension height adjuster disposed between the medial portion of each of the trailing arms and the raised portion of the floor.

7. The adjustable height trailer according to claim 3, wherein the fifth wheel hitch assembly and the rear suspension further include a plurality of adjustable, resilient airbag suspension units therewith.

8. The adjustable height trailer according to claim 3, further comprising a fold-down rear door disposed at the rearward portion of the trailer body.

9. An adjustable height trailer, comprising:
a trailer body having a forward portion, a rearward portion opposite the forward portion, a first side, a second side opposite the first side, and a floor, each of the sides having an upper edge;
an adjustable height fifth wheel hitch assembly disposed at the forward portion of the trailer body;
a hitch post adjustably depending from the fifth wheel hitch assembly;
an adjustable height rear suspension disposed at the rearward portion of the trailer body; and
a single rear axle disposed across the adjustable height suspension;
a first door installed in the first side adjacent the rearward portion of the trailer body;
a second door installed in the second side adjacent the forward portion of the trailer body;
mutually opposed first and second partition tracks respectively disposed along the upper edge of the first side and second side; and
at least one adjustable partition extending between the first side and the second side, the partition having a first end movably installed in the first partition track and a second end movably installed in the second partition track, the partition, forward portion of the trailer body, and rearward portion of the trailer body defining at least one livestock stall disposed therein.

10. The adjustable height trailer according to claim 9, wherein the floor has a raised portion at the forward portion of the trailer body, the trailer further comprising:
a tubular hitch guide extending upwardly from the raised portion of the floor, the hitch guide having an upper end;
a laterally disposed hitch guide crossmember extending across the upper end of the hitch guide, the crossmember having mutually opposed first and second arms;
the hitch post telescopically disposed within the hitch guide, the hitch post having a lower portion;
a laterally disposed hitch post crossmember extending across the lower portion of the hitch post, the crossmember having mutually opposed first and second arms;
first upper and lower suspension height adjusters disposed between the first arms of the hitch guide crossmember and the hitch post crossmember; and
second upper and lower suspension height adjusters disposed between the second arms of the hitch guide crossmember and the hitch post crossmember.

11. The adjustable height trailer according to claim 9, wherein the floor has a raised portion above the rear suspension, the trailer further comprising:
first and second trailing arms, each of the arms having a forward end pivotally attached to the floor beneath the raised portion thereof, a medial portion, and a rearward end opposite the forward end;
a rear axle disposed across the rearward end of each of the trailing arms; and
a suspension height adjuster disposed between the medial portion of each of the trailing arms and the raised portion of the floor.

12. The adjustable height trailer according to claim 9, wherein the fifth wheel hitch assembly and the rear suspension further include a plurality of adjustable, resilient airbag suspension units therewith.

13. The adjustable height trailer according to claim 9, further comprising a fold-down rear door disposed at the rearward portion of the trailer body.

* * * * *